(No Model.)

E. C. BAYNES & H. HENDERSON.
NUT LOCK.

No. 518,641. Patented Apr. 24, 1894.

Witnesses.

Edward C. Baynes.
Harry Henderson. Inventors.

By James Sangster
Attorney.

UNITED STATES PATENT OFFICE.

EDWARD C. BAYNES AND HARRY HENDERSON, OF BUFFALO, NEW YORK.

NUT-LOCK.

SPECIFICATION forming part of Letters Patent No. 518,641, dated April 24, 1894.

Application filed July 1, 1893. Renewed March 5, 1894. Serial No. 502,441. (No model.)

*To all whom it may concern:*

Be it known that we, EDWARD C. BAYNES and HARRY HENDERSON, citizens of the United States, residing in Buffalo, in the county of Erie and State of New York, have invented certain new and useful Improvements in Nut-Locks, of which the following is a specification.

Our invention relates to certain improvements in nut locks adapted for holding the fish plates for railway tracks or for any purpose for which a similar nut lock may be required, and it will be fully and clearly hereinafter described and claimed, reference being had to the accompanying drawings, in which—

Figure 1:
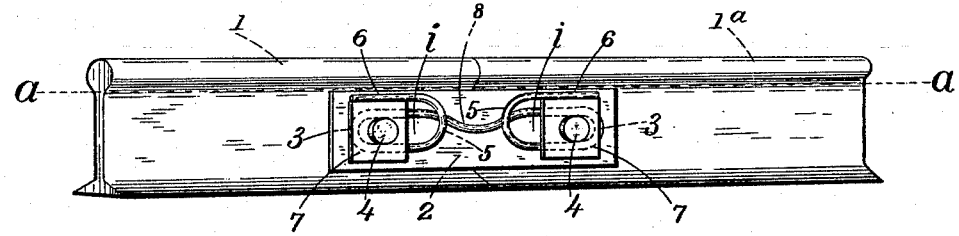
Figure 2:
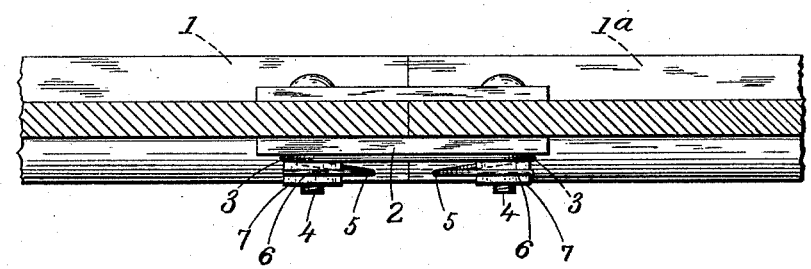
Figure 3:
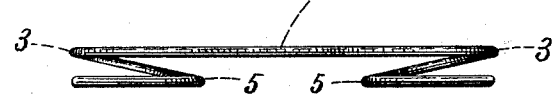
Figure 4:
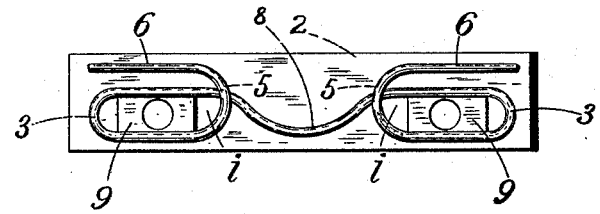

Figure 1 is a perspective view showing two portions of rail road iron, the usual fish plate and bolts for holding them and our new device connected therewith. Fig. 2, is a top view of two portions of rail road iron, a horizontal section being shown through the rails in or about line $a\ a$, Fig. 1, so as to show more clearly a similar view of our improved nut locking device connected therewith. Fig. 3, is an enlarged detached top view of our nut locking device. Fig. 4 represents a front elevation of the fish plate and the nut locking device in its proper position in front of it, showing also a slight modification of the fish plate.

The object of our invention is to provide a nut lock that will lock the nut and hold it securely at any point desired and at the same time permit the nut to be turned either way by means of an ordinary wrench when required.

In the said drawings is represented at 1—1ª, portions of an ordinary T rail for the purpose of illustrating our invention. The fish plate, 2, is of the usual construction.

Our fastening device is formed of a single bar of steel either round or square in cross section. It is formed with smaller bends 3, one at each end both alike, these bends, 3, are large enough to allow the bolts, 4, to pass through; the opening, $i$, being a little wider than the bolt and elongated as shown. There is also another bend, 5, larger than the bend, 3; it being large enough to allow the horizontally projecting ends, 6, to lie upon one of the top sides of the square nuts, 7, these larger bends are in toward the center. There is another bend, 8, between the two nut locking portions. It will be noticed that both ends of this device are bent exactly alike and are formed or bent spirally so that the portions, 6, will project forward far enough to lie on the top of the nuts, 7. For this purpose spring steel is preferred but any other well known material suitable for the purpose may be used.

In Fig. 4, we have shown a modification of the fish plate, in which raised portions, 9, are made on the face of the fish plates at the points where the bolts pass through the plate, to leave seats for the nuts, 7, to rest against when screwed up tight. The object of this construction is to provide the means for screwing the nuts up tight without interfering with or resting against the nut locking device.

The operation of the device will be easily understood from the foregoing description and drawings.

It will be seen that as a nut is being turned by a wrench, its corner as it comes around will lift the end 6, of the spring locking device and as the movement is continued until it is in or nearly in the position shown in Fig. 1, the spring portion, 6, will follow the downward movement of the corner of the nut and lie with a spring force on the flat side of it substantially as shown in said Fig. 1, and thereby hold it securely in position; from which position the nut can at any time be turned with a wrench should it become necessary.

We claim as our invention—

1. A nut lock consisting of a single piece of bar steel having two downward and inward bends 3, at opposite ends of the same, and at points near the center of the device larger upward and outward bends, 5, the two ends, 6, of which project outward horizontally in opposite directions and are adapted to rest on the flat sides of the nuts to prevent them from turning substantially as described.

2. A nut lock consisting of a single piece of bar steel having two downward and inward bends, 3, at opposite ends of the same, and at points nearer the center two larger upward and outward bends the two ends of which project horizontally outward in opposite directions, in combination with a fish plate having the raised portion, 9, substantially as and for the purposes described.

EDWARD C. BAYNES.
HARRY HENDERSON.

Witnesses:
 JAMES SANGSTER,
 ARTHUR J. SANGSTER.